United States Patent
Nakaya et al.

(10) Patent No.: US 6,808,209 B2
(45) Date of Patent: Oct. 26, 2004

(54) ATTACHMENT TO BE ATTACHED TO FUEL TANK

(75) Inventors: Hiroyuki Nakaya, Utsunomiya (JP); Kazuhiro Nakamura, Tochigi-ken (JP)

(73) Assignees: Nifco Inc., Yokohama (JP); Yachiyo Kogyo Kabushiki Kaisya, Tochigi-ken (JP)

( * ) Notice: Subject to any disclaimer, the term of this patent is extended or adjusted under 35 U.S.C. 154(b) by 170 days.

(21) Appl. No.: 10/176,641

(22) Filed: Jun. 24, 2002

(65) Prior Publication Data

US 2003/0015526 A1 Jan. 23, 2003

(30) Foreign Application Priority Data

Jun. 26, 2001 (JP) .................................... 2001-192759

(51) Int. Cl.[7] ..................... F16K 17/36; F16K 24/04; F16K 35/00
(52) U.S. Cl. ..................... 285/55; 285/228.1; 285/21.1; 137/202
(58) Field of Search .............................. 285/21.1, 21.3, 285/55, 192, 293.1, 294.3, 296.1, 288.1, 423; 137/202

(56) References Cited

U.S. PATENT DOCUMENTS

| | | | | |
|---|---|---|---|---|
| 2,246,404 A | * | 6/1941 | Ross ........................ | 15/415.1 |
| 5,522,417 A | * | 6/1996 | Tomioka et al. .............. | 137/43 |
| 6,019,348 A | * | 2/2000 | Powell ...................... | 251/144 |
| 6,382,231 B2 | * | 5/2002 | Sugizaki et al. ............ | 137/15.26 |
| 6,408,867 B2 | * | 6/2002 | Aoki et al. ................. | 137/202 |
| 6,679,282 B2 | * | 1/2004 | Aoki et al. ................. | 137/202 |

* cited by examiner

*Primary Examiner*—Eric K. Nicholson
(74) *Attorney, Agent, or Firm*—Manabu Kanesaka

(57) ABSTRACT

An attachment is fixed to a fuel tank made of a synthetic resin, and is formed of a primary molding portion and a hydrocarbon barrier layer. The primary molding portion is formed of a first material capable being welded to the fuel tank, and includes a hollow section to be inserted into fuel tank, and a flange formed on the hollow section to be connected to an outer surface of the fuel tank. The hollow section has a plurality of holes for allowing a molten resin material to flow therethrough when formed. The hydrocarbon barrier layer has a property of preventing permeation of hydrocarbon. The hydrocarbon barrier layer is formed on at least a part of an inner periphery of the cylinder section. A connection section is formed at the hollow section to have another member thereon.

8 Claims, 3 Drawing Sheets

ATTACHMENT TO BE ATTACHED TO FUEL TANK

BACKGROUND OF THE INVENTION AND RELATED ART STATEMENT

The present invention relates to an attachment to be attached to a fuel tank made of a synthetic resin.

A fuel tank made by blow molding of a synthetic resin is easily made to have rustproof and lightweight, and also can achieve the high productivity. Therefore, in recent years, such a fuel tank by blow molding of the synthetic resin has been increasingly used as a fuel tank for an automobile as disclosed in Japanese Patent Publication (KOKAI) No. 11-78549, for example.

On the other hand, the fuel tank is attached with various types of attachments, such as a vent valve for leading fuel gas in a space above a liquid surface to an outside of the tank to thereby maintain an internal pressure of the tank constant, a backflow prevention valve which is connected to a filler tube, a fuel pump, and the like. In case the tank is formed of the synthetic resin material, it is preferable that the attachments and the tank can be coupled by thermal welding in view of simplifying the manufacturing process.

However, high-density polyethylene (hereinafter referred to as HDPE), which can be thermally welded, is relatively poor in a property of preventing permeation (hereinafter referred to as a barrier property) of hydrocarbon (hereinafter referred to as HC). Thus, from the viewpoint of preventing air pollution, HDPE is not suitable to be used for the attachments for the gasoline tank.

In order to prevent the permeation or transmission of HC, it is preferable to use a material having a high barrier property, such as ethylene-vinylalcohol copolymer (hereinafter referred to as EVOH). This kind of so-called gasoline barrier material is, however, low in bonding ability by a thermal welding. Thus, if the attachments are formed of the gasoline barrier material, it is difficult to satisfy the bonding strength between the tank and the attachments.

In other words, it is desired that the attachment to be attached to the fuel tank made of the synthetic resin is sufficiently high in strength and rigidity, and is excellent in a property of resisting the swelling against the gasoline, as well as high in a barrier property. However, in order to secure the thermal welding property, that is, the property capable of being welded to the tank in addition to these properties, it is practically impossible to form the attachment by the single material.

Therefore, as in the filler tube connection section and the backflow prevention valve disclosed in Japanese Patent Publication (KOKAI) No. 11-78549, it can be considered to adopt the structure for assembling a plurality of parts, in which materials with optimum properties are respectively used in accordance with positions thereof. However, since each material has the advantage and disadvantage as described above, the aforementioned need can not be achieved by merely forming the filler tube connection section and the backflow prevention valve by the separate members.

The present invention has been made to solve the aforementioned problems in the prior art, and an object of the invention is to provide an attachment to be attached to a fuel tank made of a synthetic resin, in which the strength, rigidity, property of resisting the swelling against gasoline, high barrier property and thermal welding property with respect to the tank can coexist at the high level, respectively.

Further objects and advantages of the invention will be apparent from the following description of the invention.

SUMMARY OF THE INVENTION

To achieve the aforementioned object, the first aspect of the present invention provides an attachment to be attached to a fuel tank made of a synthetic resin, which comprises a primary molding portion having a flange and a cylinder or hollow section (valve main body connection section); and an HC barrier material layer (secondary molding portion) formed on at least one part of an inner periphery of the cylinder section. The primary molding portion is formed of a material capable of being welded to the fuel tank. The flange is connected to an outer surface of the fuel tank, and the cylinder section is inserted into the fuel tank.

Also, the cylinder section is provided with a hole for allowing a molten resin material to flow therethrough, and the HC barrier material layer is formed by a two-material molding method. In the attachment to be attached to the fuel tank made of the synthetic resin structured as described above, another part or valve main body is connected to a portion of the material, which is capable of being welded to the fuel tank and is exposed to an outer peripheral surface of the cylinder section.

The attachment to be attached to the fuel tank made of the synthetic resin is formed of the material capable of being welded, and the barrier material by the two-material molding method as described above, so that both the thermal welding property of the portion connected to the fuel tank and the barrier property can coexist. Then, if another part is formed of a material excellent in the property of resisting the swelling against gasoline, and is connected to the portion where the material capable of being welded is exposed, both the strength and the rigidity in a connecting portion to another part can be obtained.

Also, according to the second aspect of the invention, a plurality of holes is formed at portions for substantially equally dividing the circumference of the cylinder section adjacent to the flange. Accordingly, the flow of the secondary resin at the time of the two-material molding can be equalized.

Further, according to the third aspect of the invention, the part includes a cylindrical portion (an enlarged diameter portion) fitted outside the cylinder section. Accordingly, when the portion connected to the fuel tank is expanded together with the fuel tank, the connecting portion of the part tends to be tightly fitted, so that there is no problem that the part is loosened.

DETAILED DESCRIPTION OF PREFERRED EMBODIMENT

Hereunder, an embodiment of the present invention will be explained in detail with reference to the accompanying drawings.

Figure 1:
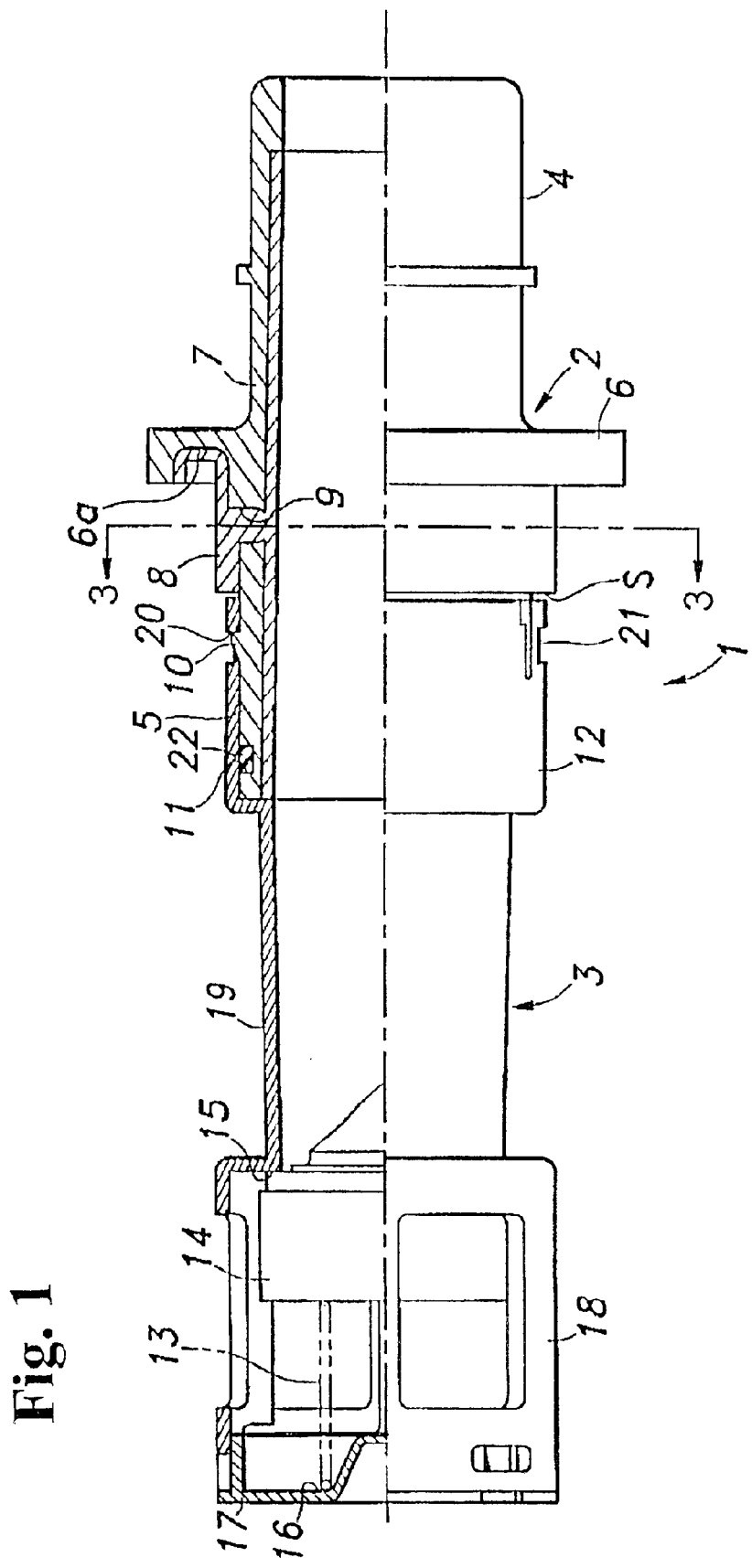
FIG. 1 is a front view of a fuel backflow prevention valve assembly according to the present invention, partially shown in section.

FIG. 1 shows a fuel backflow prevention valve assembly structured according to the present invention. The fuel backflow prevention valve assembly 1 is formed of a connection section 2 to a tank, and a valve main body 3.

The connection section 2 to the tank has a cylindrical shape. In the connection section 2 to the tank, a filler tube connection section 4 is provided at a portion projecting outside the tank, and a valve main body connection section 5 is provided at a portion to be located inside the tank. Also, in the connection section 2, a flange 6 to be fitted on an outer surface of the tank is provided at an axially intermediate position between the filler tube connection section 4 and the valve main body connection section 5.

The connection section 2 to the tank is formed of a primary molding portion 7 (shown by rough hatching in the figure), and a secondary molding portion 8 (shown by fine hatching in the figure). The primary molding portion 7 is formed of HDPE, and includes the filler tube connection section 4, the valve main body connection section 5, and a major portion of the flange 6.

The secondary molding portion 8 constitutes an HC barrier material layer formed of EVOH, and includes a major portion of the inner peripheral surface of the primary molding portion 7, an inner side of an annular groove 6a formed at an inner periphery side of the flange 6 opposed to the tank, and an outer peripheral surface adjacent to a bottom of the flange 6. They are formed by a two-material molding method, in which the primary molding portion 7 is inserted to form the secondary molding portion 8.

Figure 2:
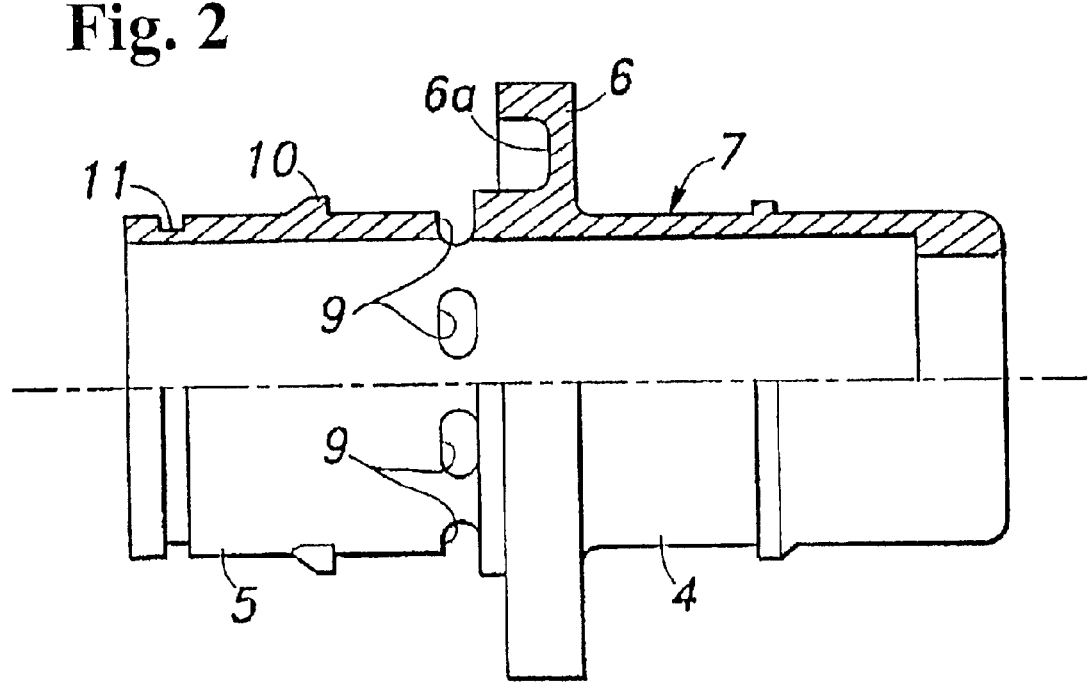
FIG. 2 is a front view of a primary molding portion partially in section.
Figure 3:
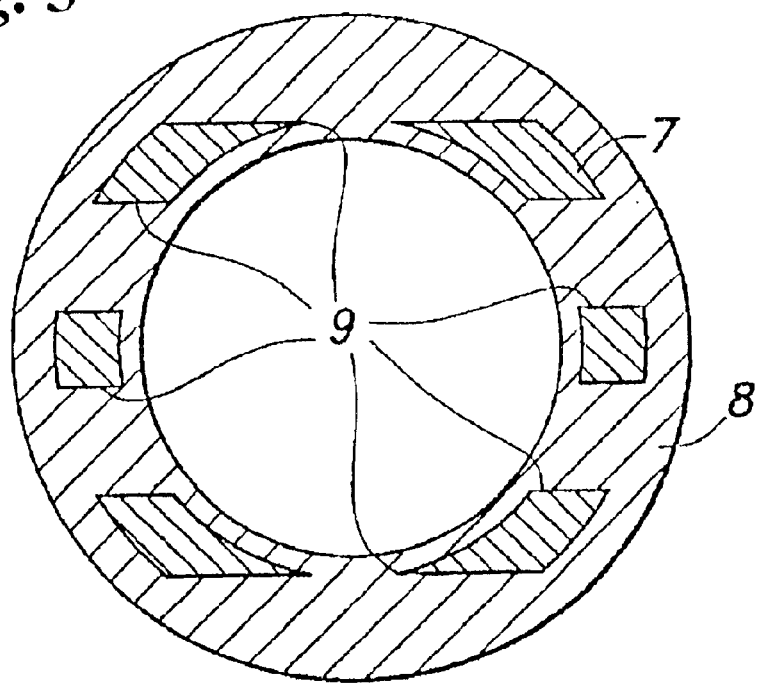
FIG. 3 is a cross sectional view taken along line 3—3 in FIG. 1.

As shown in FIG. 2 and FIG. 3, in the primary molding portion 7, a plurality of holes 9 is provided at portions for substantially equally dividing the circumference at the portion adjacent to the bottom of the flange 6, and it is designed that the molten EVOH flowing into a metallic die from a gate enters to the inner periphery side of the primary molding portion 7 through the holes 9. As described above, by providing the holes 9, through which molten EVOH flows, at the portions dividing the circumference substantially equally, the molten resin material can flow equally.

At the portion adjacent to the root or bottom of the flange 6, by forming the secondary molding portion 8 on the outer periphery of the primary molding portion 7, there is formed a step S having a different diameter between the secondary molding portion 8 and the valve main body connection section 5. Also, at a position adjacent to the step S on the outer peripheral surface of the valve main body connection section 5, claws 10 having a section in a substantially triangular shape is formed, and an O-shaped ring attachment groove 11 are formed at an end portion of the valve main body connection section 5.

The valve main body 3 is formed of an enlarged diameter portion 12 fitted on the outer peripheral surface of the valve main body connection section 5; a poppet valve 14 elastically pressed by a compression coil spring 13; a poppet valve receiving section 18 which is provided with a valve seat 15 closed by the poppet valve 14 abutting thereagainst and is closed by an end cap 17 provided with a spring seat 16; and a connecting section 19 for connecting the enlarged diameter portion 12 and the poppet valve receiving section 18. The respective members described above are formed of a polyacetal resin material that is excellent in property of resisting the swelling against gasoline.

The poppet valve 14 is normally pressed against the valve seat 15 by the elastic force of the compression coil spring 13 to disconnect the communication between the inside and the outside of the tank, and when gasoline flows in from a fuel port, the poppet valve 14 is pushed to open.

In the opening end side of the enlarged diameter portion 12, there are formed claw receiving holes 20 for receiving the claws 10 on the outer peripheral surface of the valve main body connection section 5. At both sides of each claw receiving hole 20 in the circumferential direction, there are formed slits 21 such that the claw receiving hole 20 is elastically engaged with the claw 10 after the opening side of the enlarged diameter portion 12 is elastically deformed outwardly in the radial direction to pass over the claw 10.

As described above, the enlarged diameter portion 12 of the valve main body 3, which is formed of the material relatively difficult to swell, is fitted through the O-ring 22 to the outer peripheral surface of the valve main body connection portion 5, which is integrally formed with the connection section 2 to the tank in view of the thermal welding property with respect to the tank. Therefore, when the tank is expanded, the portion between the valve main body connection section 5 and the enlarged diameter portion 12 tends to be tightly fitted. Thus, there is no possibility that this fitting portion is loosened.

Figure 4:
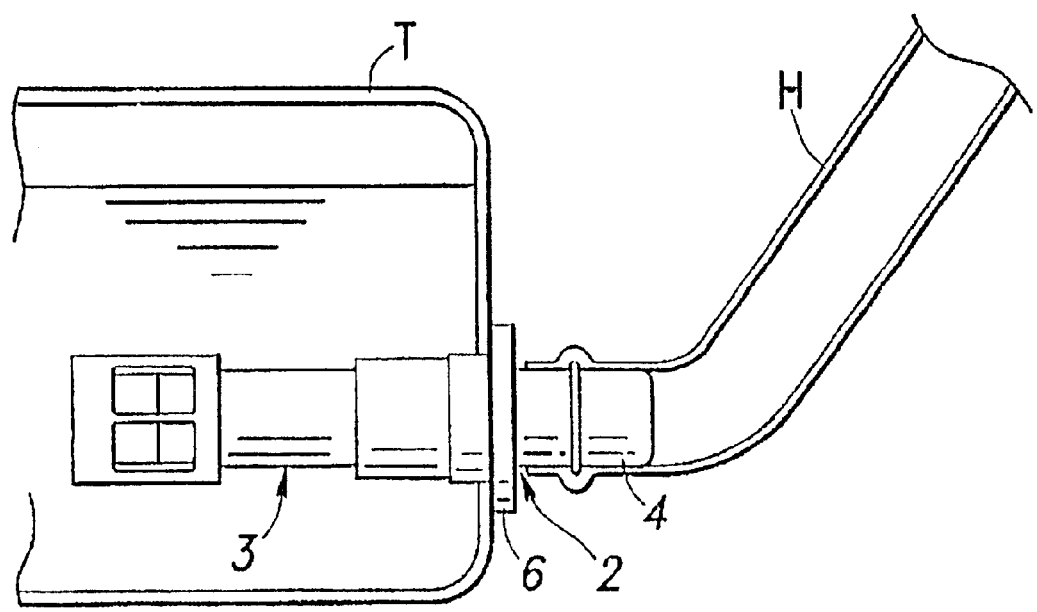
FIG. 4 is a structural view schematically showing a part of a fuel tank for an automobile, to which the present invention is applied.

As shown in FIG. 4, the fuel backflow prevention valve assembly 1 in the above structure is integrally attached to a fuel tank T by inserting the valve main body 3 side into the tank T provided with a hole opened in advance and thermally welding the flange 6 on the outer surface of the tank. Then, through a rubber hose H or the like connected to the filler tube connection section 4 and projected to the outside of the tank, the fuel backflow prevention valve assembly 1 is connected to the fuel port opened toward an outside of the vehicle. Since the connection section 2 to the tank is provided with the HC barrier material layer formed around the connection section to the tank and the inner peripheral surface thereof, the permeation of HC can be greatly prevented.

As described above, according to the present invention, in the attachment to be attached to the fuel tank made of the synthetic resin, the strength, rigidity, property of resisting the swelling against the gasoline, the high barrier property, and the thermal welding property with respect to the tank can all coexist at the high level.

Especially, according to the second aspect, if a plurality of holes is formed at the positions for equally dividing the circumference of the cylinder section (valve main body connection section) in the portion adjacent to the flange, flow of the secondary resin at the time of two-material molding method can be equalized.

Further, according to the third aspect, if the other part, i.e. valve main body in the embodiment, includes a cylindrical portion, i.e. enlarged diameter portion in the embodiment, fitted outside the cylinder section, when the portion connected to the tank is expanded together with the tank, the connection portion of the another part tends to be tightly fitted. Thus, there is no possibility that the part is loosened.

While the invention has been explained with reference to the specific embodiment of the invention, the explanation is illustrative and the invention is limited only by the appended claims.

What is claimed is:

1. An attachment to be attached to a fuel tank made of a synthetic resin, comprising:

a primary molding portion formed of a first material capable of being welded to the fuel tank, and including a hollow section to be inserted into the fuel tank, and a flange formed on the hollow section to be connected to an outer surface of the fuel tank, said hollow section having a plurality of holes for allowing a molten resin material to flow therethrough, a hydrocarbon barrier layer formed of a second material having a property of preventing permeation of hydrocarbon and being different from the first material, said hydrocarbon barrier layer being formed on at least a part of an inner periphery of the hollow section, and a connection section to be attached to another member with a cylindrical portion and formed at the hollow section with the hydrocarbon barrier layer deposited therein so that said cylindrical portion of the another member is fitted onto an outer surface of the hollow section.

2. An attachment according to claim 1, wherein said holes are formed at portions for substantially equally dividing a circumference of the hollow section adjacent to the flange.

3. An attachment according to claim 1, wherein said hydrocarbon barrier layer is a secondary molding portion molded with the primary molding portion.

4. An attachment according to claim 1, wherein said hydrocarbon barrier layer includes an inner portion substantially entirely located inside the hollow section, and an outer portion located outside an outer surface of the hollow section passing through the holes.

5. An attachment according to claim 4, wherein said connection section includes a plurality of claws formed on an outer periphery of the hollow section.

6. An attachment according to claim 4, wherein said hollow section includes a first connecting section to be located outside the fuel tank, and a second connecting section to be located inside the fuel tank, said flange extending radially outwardly from the first connecting section at a position close to the second connecting section, said outer portion of the hydrocarbon barrier layer being located outside the hollow section extending from the flange to the second connecting section.

7. An attachment according to claim 6, wherein said outer portion of the hydrocarbon barrier layer is located at one side of the flange.

8. An attachment according to claim 7, wherein said second connecting section is substantially entirely sandwiched between the hydrocarbon barrier layer and the cylindrical portion of the another member.

\* \* \* \* \*